(12) United States Patent
Landmann

(10) Patent No.: US 9,448,055 B2
(45) Date of Patent: *Sep. 20, 2016

(54) ELECTRONIC INTERFACE FOR LVDT-TYPE PRESSURE TRANSDUCERS USING PIEZORESISTIVE SENSORS

(71) Applicant: Kulite SemiConductor Products, Inc., Leonia, NJ (US)

(72) Inventor: Wolf Landmann, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,413

(22) Filed: Oct. 13, 2015

(65) Prior Publication Data

US 2016/0033256 A1 Feb. 4, 2016

Related U.S. Application Data

(63) Continuation of application No. 13/356,930, filed on Jan. 24, 2012, now Pat. No. 9,157,822.

(60) Provisional application No. 61/438,564, filed on Feb. 1, 2011.

(51) Int. Cl.
*G01B 7/14* (2006.01)
*G01B 7/30* (2006.01)
(Continued)

(52) U.S. Cl.
CPC .............. *G01B 7/30* (2013.01); *G01D 5/2291* (2013.01); *G01L 9/06* (2013.01)

(58) Field of Classification Search
CPC ............ G01D 5/2291; G01D 5/2216; G01D 5/2258; G01D 5/2412; G01D 5/2013; G01D 5/485; G01D 5/18; G01D 5/22; G01B 7/30; G01B 7/312; G01B 7/02; G01B 7/14; G01B 7/023; G01B 7/003; G01L 1/12; G01N 27/72; G01R 33/18; G01R 33/12; G01R 27/02; G01R 27/26; G01R 27/2605; G01R 29/22; G01R 11/00
USPC ......... 324/207.18, 207.19, 207.13, 209, 610, 324/725, 727, 109; 73/702, 708, 721, 727
See application file for complete search history.

(56) References Cited

U.S. PATENT DOCUMENTS 3,765,244 A 10/1973 Brzezinski
4,171,509 A 10/1979 Stephens et al.
(Continued)

*Primary Examiner* — Tung X Nguyen
*Assistant Examiner* — Thang Le
(74) *Attorney, Agent, or Firm* — Troutman Sanders LLP; James E. Schutz; Christopher C. Close, Jr.

(57) ABSTRACT

Aspects of the present disclosure relate to a method that includes receiving, at first and second input terminals, first and second input voltages and maintaining the direction of the first and second input voltages and doubling the first and second input voltages. The method also includes measuring, by a Wheatstone bridge, an applied physical parameter; outputting, to a capacitor, and to first and second operational amplifiers, first and second signals substantially indicative of the physical parameter; reducing, by the capacitor, a DC component of the first and second signals; amplifying, by the first and second operational amplifiers, the first and second signals; and adjusting, by a gain resistor, a differential output between first and second output voltages that correspond to the first and second signals output from the Wheatstone bridge. Finally, the method includes outputting, by first and second output terminals, the first and second output voltages.

17 Claims, 5 Drawing Sheets

(51) Int. Cl.
*G01D 5/22* (2006.01)
*G01L 9/06* (2006.01)

(56) References Cited

U.S. PATENT DOCUMENTS

| | | | | |
|---|---|---|---|---|
| 4,337,665 A | * | 7/1982 | Sato | G01L 9/065 73/708 |
| 4,345,477 A | * | 8/1982 | Johnson | G01L 1/2281 257/419 |
| 4,576,052 A | * | 3/1986 | Sugiyama | G01L 9/0042 257/E29.324 |
| 4,654,539 A | | 3/1987 | Moller | |
| 5,146,788 A | | 9/1992 | Raynes | |
| 5,398,194 A | | 3/1995 | Brosh et al. | |
| 5,428,985 A | * | 7/1995 | Kurtz | G01L 1/2281 73/23.27 |
| 5,612,488 A | * | 3/1997 | Yamamoto | G01D 3/08 73/1.38 |
| 5,616,846 A | | 4/1997 | Kwasnik | |
| 5,777,235 A | | 7/1998 | Altwein | |
| 2004/0090227 A1 | * | 5/2004 | Hiramatsu | G01D 5/2291 324/207.18 |
| 2005/0072233 A1 | * | 4/2005 | Nozoe | G01C 19/5607 73/514.16 |
| 2005/0285601 A1 | | 12/2005 | Seto | |
| 2006/0130583 A1 | * | 6/2006 | Nakayama | G01P 15/123 73/514.33 |
| 2007/0116502 A1 | | 5/2007 | Shimizu et al. | |
| 2007/0222193 A1 | * | 9/2007 | Ito | B60R 21/0136 280/735 |
| 2007/0228500 A1 | | 10/2007 | Shimazu et al. | |
| 2010/0207556 A1 | | 8/2010 | Zhao et al. | |
| 2010/0219822 A1 | * | 9/2010 | Suzuki | G01D 1/00 324/252 |
| 2010/0225352 A1 | | 9/2010 | Pertijs | |

* cited by examiner

ELECTRONIC INTERFACE FOR LVDT-TYPE PRESSURE TRANSDUCERS USING PIEZORESISTIVE SENSORS

CROSS-REFERENCE TO RELATED APPLICATION

This application is a continuation of and claims priority under 35 U.S.C. 120 to U.S. patent application Ser. No. 13/356,930, which was filed on Jan. 24, 2012. U.S. patent application Ser. No. 13/356,930 claims the benefit of U.S. Provisional Patent Application No. 61/438,564, which was filed on Feb. 1, 2011. The entire contents and substance of each of these applications are hereby incorporated by reference in their entirety as if fully set forth herein.

TECHNICAL FIELD

The present disclosure relates to LVDT-type pressure transducer assemblies.

BACKGROUND

A Linear Variable Differential Transformer (LVDT) is a type of electrical transformer used for measuring linear (i.e. translational) displacement. Linear variable differential transformers, as illustrated in FIG. 1 (prior art), are often used as physical sensing elements in electronic circuits to provide an electrical measurement of small physical displacements, such as those produced by linear movements or pressure changes.

Early LVDT pressure transducers included mechanical components, such as an aneroid or a Bourdon tube, as illustrated in FIG. 2. The pressure applied to the aneroid caused a displacement of the core of the LVDT, thereby generating an output ratio R proportional with the applied pressure. The pressure was then determined by measuring the two output voltages V1 and V2 of the LVDT and calculating the ratio R. These LVDT pressure transducers had significant shortcomings, however, primarily due to the mechanical nature of their components. These shortcomings typically included poor accuracy, poor stability, sensitivity to vibration and shocks, and large hysteresis, i.e., sticking, due to the mechanical friction of the core. As a result, they were subject to transducer failure and erroneous outputs, particularly when subjected to high-vibration environments and acceleration forces. Therefore, while conventional mechanical LVDTs are still commonly used, it is desirable to replace them with improved LVDT-type sensing circuits that are less prone to transducer failure and erroneous output.

Solid-state implementations of LVDT-type pressure transducers have been introduced to obviate many of the shortcomings of their mechanical counterparts. One solid-state LVDT-type transducer uses a piezoresistive bridge for pressure sensing and an electronic circuit to generate LVDT-type output, as described in U.S. Pat. No. 5,398,194 ("ELECTRONIC SENSING CIRCUIT USING PIEZORESISTORS," issued to Amnon Brosh et al. on Mar. 14, 1995 and assigned to Kulite Semiconductor Products, Inc., Leonia, N.J.). FIG. 3 provides a schematic of an implementation of one such solid-state circuit. While such solid-state traducers eliminate many of the shortcomings of mechanical LVDT-type pressure sensors, they have drawbacks of their own. For example, it has been observed that these solid-state transducers require a transformer to function properly. Disadvantageously, however, transformers are large, heavy, and expensive, often costing more than the remaining transducer components combined. Thus the cost and size are often incompatible with desired uses.

Therefore a need exists for an improved replacement LVDT-type pressure transducer that obviates the need for undesirable electro-mechanical components or transformers. It is to this need that the present disclosure addresses.

BRIEF SUMMARY OF DISCLOSURE

Exemplary embodiments of the present disclosure may provide an LVDT-type pressure transducer assembly, comprising a first and second input terminal for receiving a first and second input voltage, respectively, wherein the first and second input voltages are about 180° relative to each other, a Wheatstone bridge configured to receive the first and second input voltages, wherein the Wheatstone bridge is adapted to measure an applied physical parameter and output first and second signals substantially indicative of the physical parameter, and a first output terminal and a second output terminal for outputting a first and second output voltage, respectively, that correspond to the first and second signal, respectively, wherein a sum of the first and second output voltages remains relatively constant, and wherein the pressure transducer assembly does not comprise a transformer component.

Other exemplary embodiments of the present disclosure may provide a transformer-less LVDT-type pressure transducer assembly, comprising a first and second input terminal for receiving a first and second input voltage, respectively, a rectifying circuit assembly adapted to receive the first and second input voltages, maintain the direction of the first and second input voltages, and double the first and second input voltages, a sensing element configured to receive the first and second input voltages from the rectifying circuit, wherein the sensing element is adapted to measure an applied pressure and output first and second signals substantially indicative of the pressure, and a first output terminal and a second output terminal for outputting a first and second output voltage, respectively, that correspond to the first and second signal, respectively, wherein the first and second output voltages change relative to each other depending upon the direction and amount of the applied pressure.

Other exemplary embodiments of the present disclosure may provide a method that includes receiving, at first and second input terminals, first and second input voltages, respectively, wherein the first and second input voltages are about 180° relative to each other and, responsive to receiving, at a rectifying circuit assembly in electrical communication with the first and second input terminals, the first and second input voltages, maintaining the direction of the first and second input voltages and doubling the first and second input voltages. The method may further include measuring, by a Wheatstone bridge, an applied physical parameter and outputting, by the Wheatstone bridge and to a capacitor, and to first and second operational amplifiers, first and second signals substantially indicative of the physical parameter. Moreover, the method may include reducing, by the capacitor, a DC component of the first and second signals and amplifying, by the first and second operational amplifiers, the first and second signals. Finally, the method may include adjusting, by a gain resistor in electrical communication with the first and second operational amplifiers, a differential output between first and second output voltages that correspond to the first and second signals output from the Wheatstone bridge, respectively, and outputting, by a first output terminal and a second output terminal, the first and second output voltages, respectively.

DETAILED DESCRIPTION OF PREFERRED EMBODIMENTS

Figure 1:
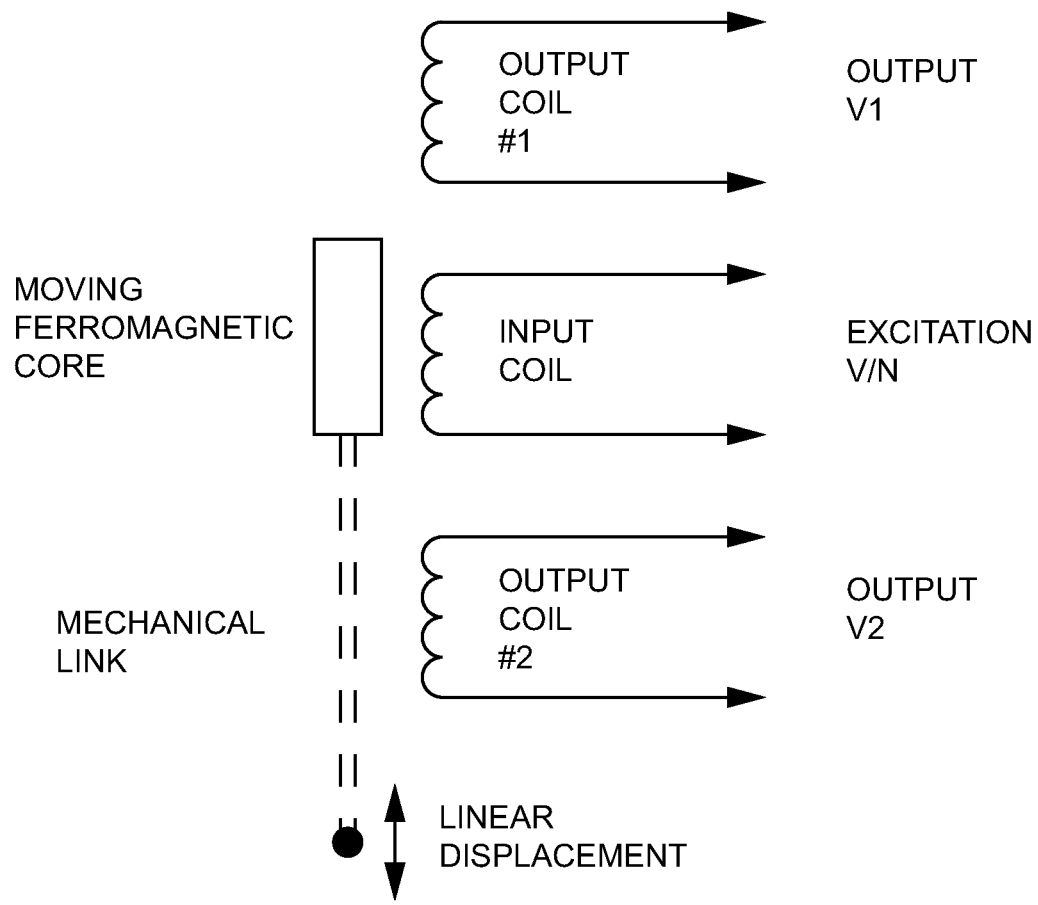
FIG. 1 illustrates a linear displacement LVDT of the prior art.
Figure 2:
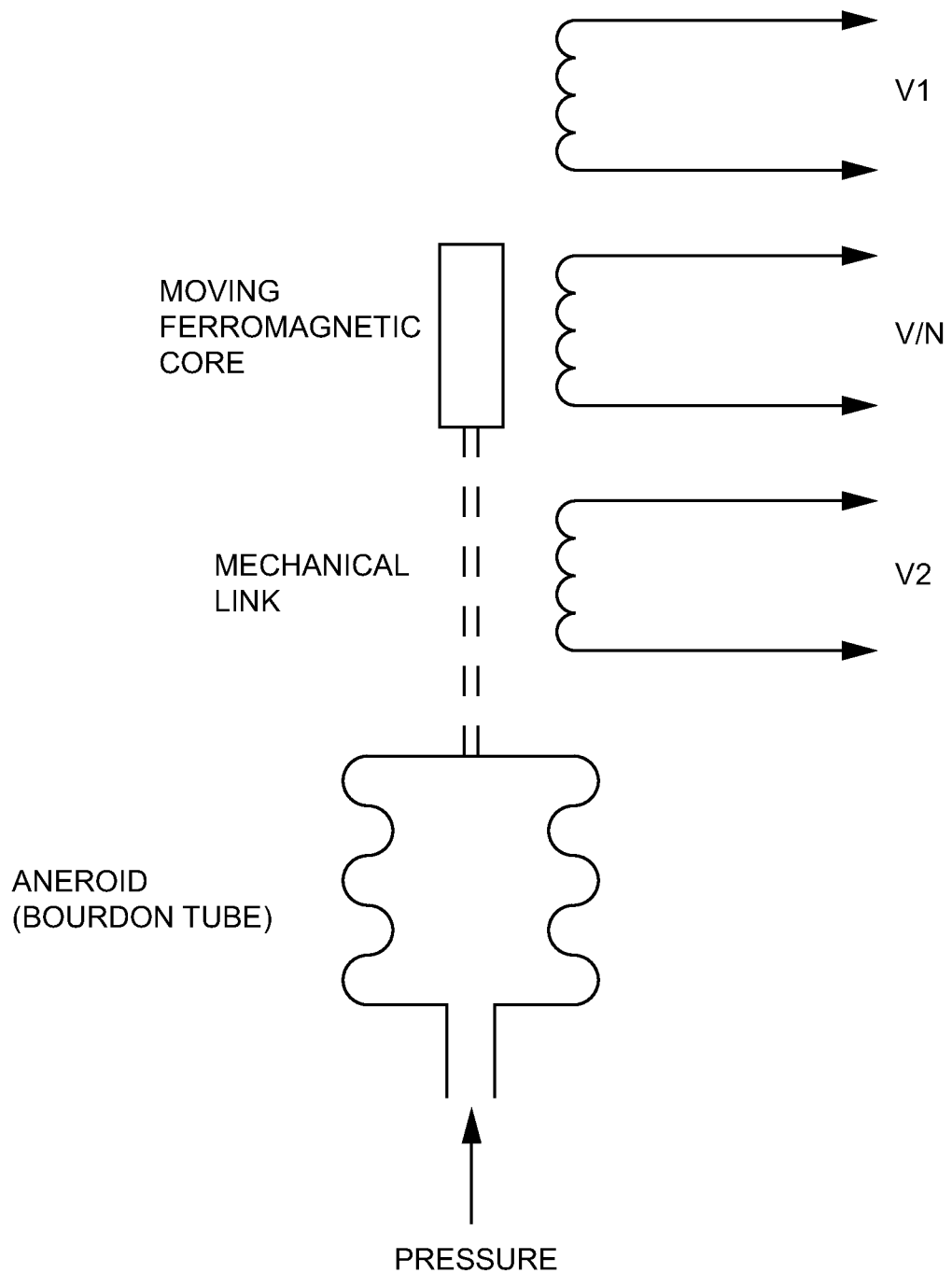
FIG. 2 illustrates an LVDT-type pressure transducer assembly of the prior art.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an," and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the drawings, in which like numerals represent like elements, exemplary embodiments of the present disclosure are herein described. It is to be understood that the figures and descriptions of the present disclosure have been simplified to illustrate elements that are relevant for a clear understanding of the present disclosure, while eliminating, for purposes of clarity, many other elements found in typical pressure sensor assemblies and methods of making and using the same. Those of ordinary skill in the art will recognize that other elements are desirable and/or required in order to implement the present disclosure. However, because such elements are well known in the art, and because they do not facilitate a better understanding of the present disclosure, a discussion of such elements is not provided herein.

Figure 4:
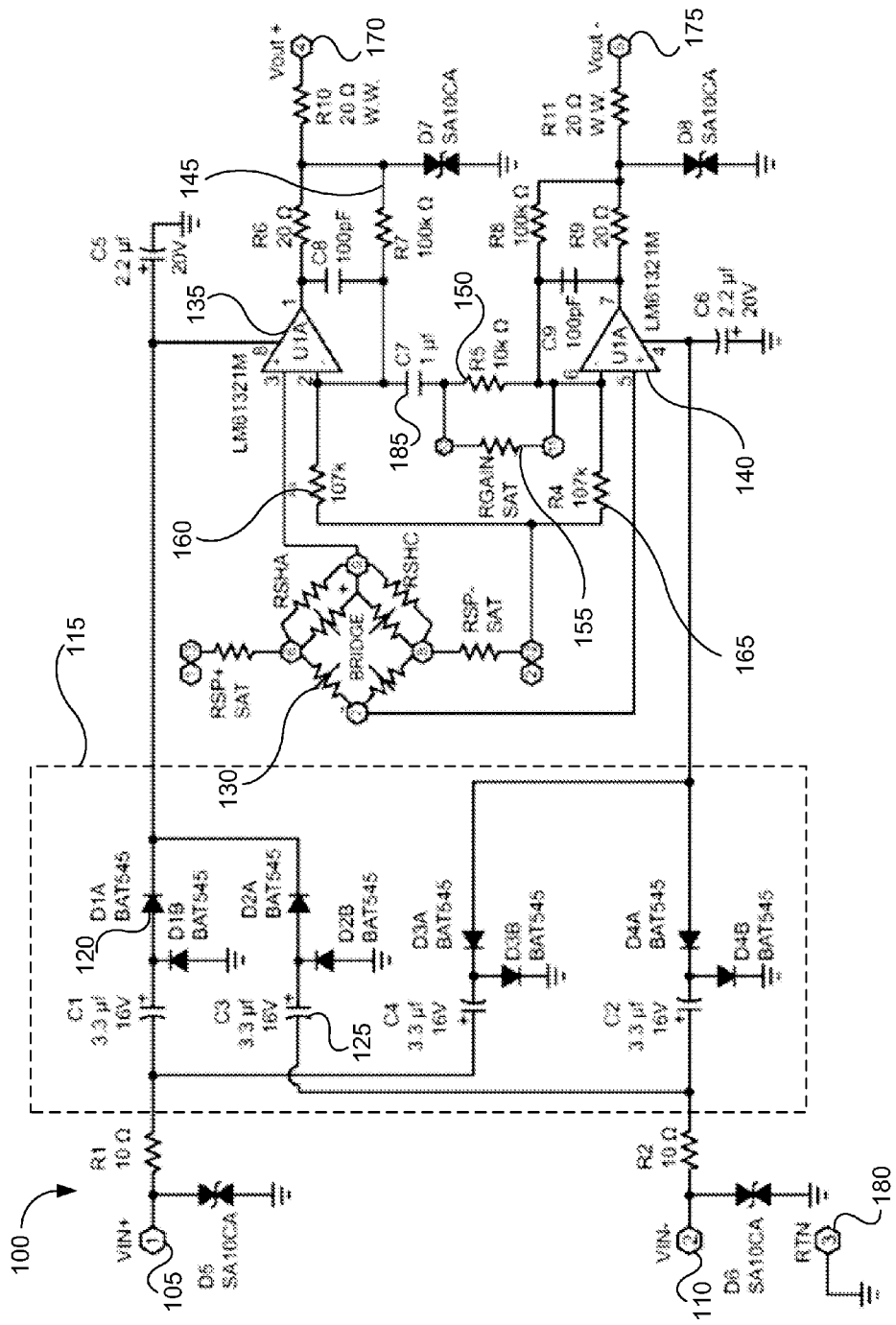
FIG. 4 illustrates the circuitry of an exemplary embodiment of the LVDT-type transducer assembly of the present disclosure.

Exemplary embodiments of the present disclosure provide a transformer-less, solid-state pressure transducer assembly having significantly better characteristics than those of the prior art. An exemplary embodiment of the pressure transducer assembly of the present disclosure is illustrated in FIG. 4. The pressure transducer assembly of the present disclosure achieves many of the same functions as transducer assemblies of the prior art having transformers, however the pressure transducer assembly of the present disclosure is smaller in size and weight, costs less to manufacture, and has increased reliability.

Figure 5A:
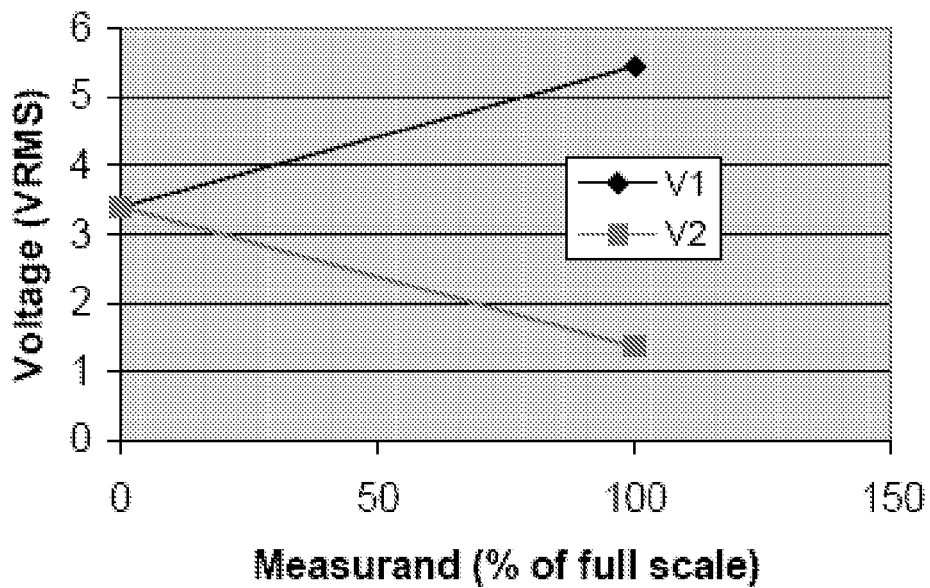
FIGS. 5A and 5B graphically illustrate values of outputs V1 and V2 versus pressure and their corresponding ratio, respectively, of the embodiment illustrated in FIG. 4.

To generate an accurate LVDT-type output, LVDT-type pressure transducer assemblies should satisfy certain requirements. First, the DC voltage(s) should be substantially minimized, if not removed as circuits that measure LVDT type signals are sensitive to AC signals only, and a spurious DC component will interfere with their intended operation. Second, the pressure transducer circuitry should accommodate relatively large output voltages as the output voltages can reach about 5.5 VRMS, as illustrated in FIG. 5A. Third, the output voltages should have a relatively large bias (initial value at zero pressure) such that when the pressure increases, the decreasing voltage does not reach zero, as illustrated in FIG. 5A. Fourth, the sum of the two output voltages should remain relatively constant. Fifth, the phase shift of the two output voltages relative to the input voltage(s) should be substantially zero. The pressure transducer assembly of the present disclosure satisfies these requirements without the use of a transformer, therefore making it a desirable replacement over prior art embodiments.

As illustrated in FIG. 4, the voltage supply of the pressure transducer assembly 100 is provided by two AC voltages VIN+ (105) and VIN− (110). In an exemplary embodiment, the input voltages VIN+ (105) and VIN− (110) can have a magnitude of about 3.5 VRMS. VIN− (110) may be about 180° relative to VIN+ (105), thus VIN−=−VIN+, therefore making VIN+ (105) about 3.5 VRMS and VIN− (110) about −3.5 VRMS. It should be understood that in other exemplary embodiments, the magnitude of the input voltages can be higher or lower based on system requirements. For example and not limitation, it may be desirable to have input voltages around about ±5.0 VRMS. It shall be further understood that all voltages within the pressure transducer assembly 100, including the two output voltages V1 (170) and V2 (175), which are labeled in this schematic as Vout+ and Vout−, respectively, and will be further discussed herein, are measured relative to the pin RTN (180). Further, the phase reference of all the voltages within the circuit is the phase of voltage VIN+ (105). Thus, the phase shift of the voltages within the pressure transducer assembly is preferably substantially zero.

Figure 3:
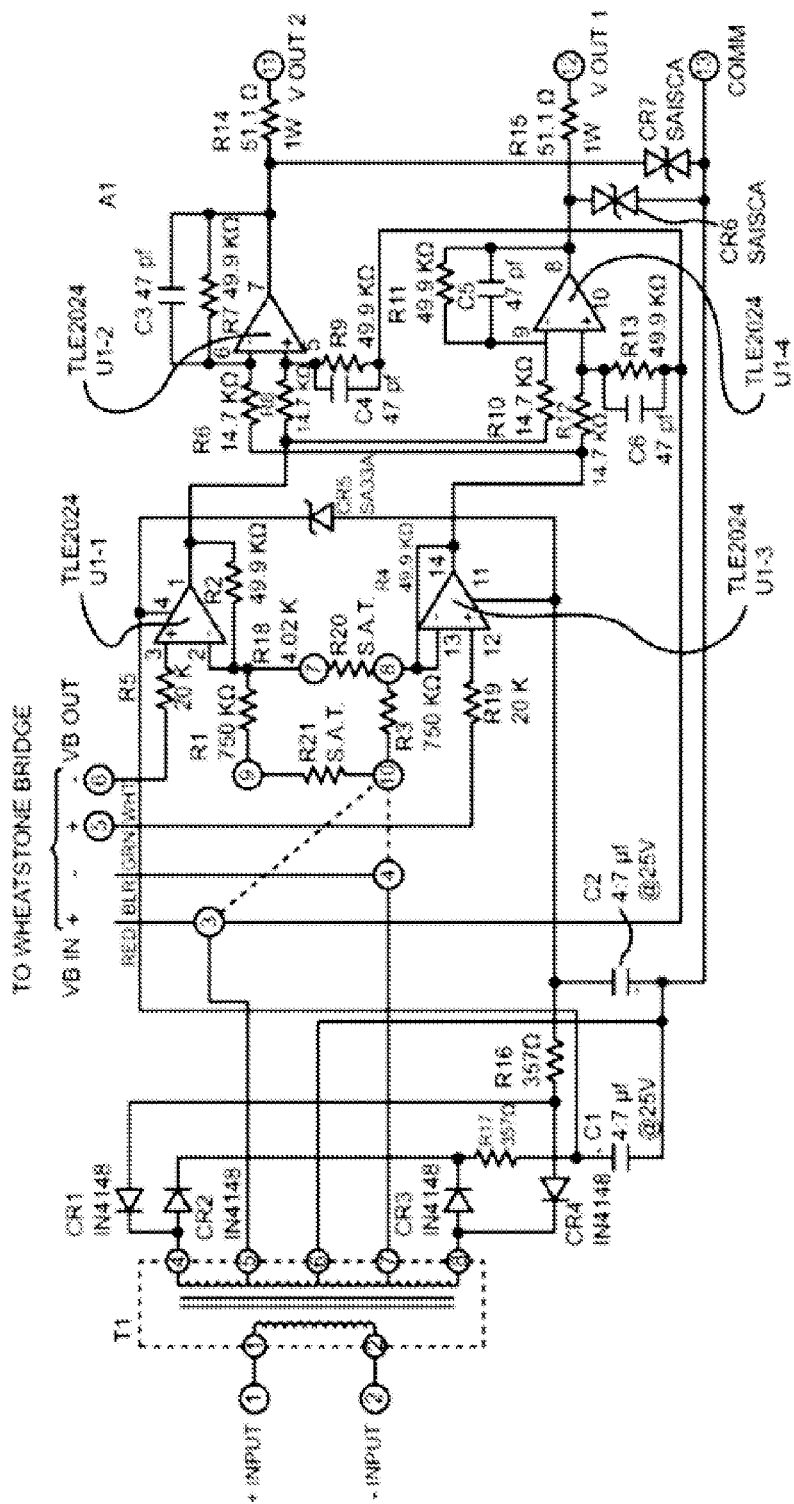
FIG. 3 illustrates a solid-state LVDT-type transducer assembly of the prior art.

In prior art embodiments, such as the embodiment illustrated in FIG. 3, transformers were utilized as both a rectifying and doubling circuit, whereby the incoming voltage was doubled to enable better detection of output voltages. The present disclosure, however, eliminates the need for a transformer and replaces the transformer with a rectifying circuit assembly 115, as illustrated in FIG. 4. The rectifying circuit assembly 115 of the present disclosure receives input voltages VIN+ (105) and VIN− (110) and comprises a plurality of diodes 120 and capacitors 125 in electrical communication with each other and adapted to work together to double the rectified voltages, as previously carried out by the transformer in prior art embodiments, and maintain the positive and negative voltages of the VIN+ (105) and VIN− (110), respectively. In alternative embodiments, the voltage may be retained at near constant levels or increased by a multiple other than two.

The rectifying circuit assembly 115 then feeds VIN+ (105) and VIN− (110) voltages to a sensing element, such as a Wheatstone bridge 130. The Wheatstone bridge 130 is adapted to measure an applied pressure and output voltage signals substantially indicative of the applied pressure, which are subsequently outputted as first and second output voltages V1 and V2, which will be further discussed herein. The Wheatstone bridge 130 comprises four piezoresistor elements arranged in two bridge legs that are connected in parallel. Each bridge leg comprises two piezoresistor elements connected in series, wherein one piezoresistor element in each leg senses a physical parameter, such as pressure, applied in one direction, and the other piezoresistor element in each leg senses the physical parameter, such as pressure, applied in the opposite direction. Thus, when pressure is applied in a particular direction, the resistances of the corresponding pair of piezoresistor elements in each leg increase and correspondingly change the bridge outputs accordingly. The outputs from the Wheatstone bridge 130 are utilized to generate two voltage outputs, V1 (170) and V2 (175) from the pressure transducer assembly 100, wherein the applied pressure may be determined by calculating ratio R, which is defined as:

$$R = \frac{V1 - V2}{V1 + V2}$$

Figure 5B:
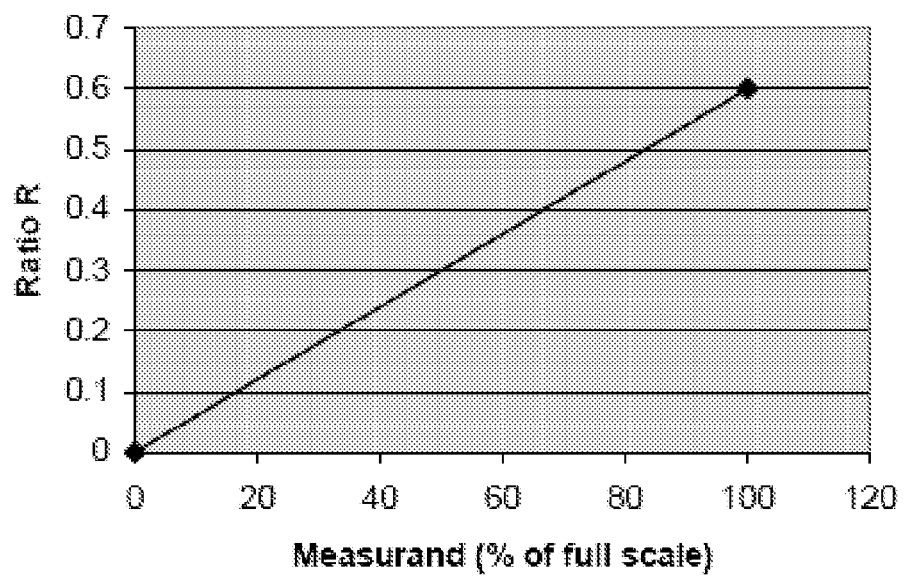

Ratio R is proportional to the applied pressure. Thus, according to the equation, when no pressure is applied to the piezoresistor elements, the output V1 and V2 are equal and at a null point. Further, when there is an increase in pressure in one direction, output V1 increases while output V2 decreases. Similarly, when there is an increase in pressure in the opposite direction, output V1 decreases and output V2 correspondingly increases. Thus, the output voltages V1 and V2 change relative to each other depending upon the direction and amount of the applied pressure, in a manner similar to the output voltages provided by an LVDT assembly. FIGS. 5A and 5B graphically illustrate the values of the two output voltages V1 (170) and V2 (175) and the ratio R relative to pressure, respectfully, wherein "measurand" is the distance for LVDT displacement or input pressure LVDT-type pressure transducers.

As previously described, the Wheatstone bridge 130 may be supplied with AC input voltages from the rectifying circuit assembly, which have a frequency of about 3 kHz, such that the Wheatstone bridge 130 generates a low-level AC voltage that is both proportional with the pressure and ratiometric with the input voltages. It shall be understood that the two output voltages V1 (170) and V2 (175) are also AC voltages, are of the same frequency, and are substantially in-phase with the input voltages.

The Wheatstone bridge 130 outputs may be amplified by an instrumentation-type differential amplifier implemented via first and second operational amplifiers, U1A (135) and U1B (140), respectively, before they are outputted as first and second output voltages V1 (170) and V2 (175), respectively. Prior art embodiments, such as the embodiment illustrated in FIG. 3, utilize four operational amplifiers. The pressure transducer assembly 100 of the present disclosure simplifies this circuitry as it utilizes two operational amplifiers to generate a sufficient voltage level. Further, the first and second operational amplifiers 135/140 are in electrical communication with gain resistor RGAIN (155), which enables the first and second operational amplifiers 135/140 to output what four operational amplifiers of the prior art outputted, and adjusts the V1 (170) and V2 (175) outputs so that they maintain a relatively constant V1+V2 sum. It shall be understood that RGAIN (155) may be a variable resistor component or a set resistor component. Further, the ratio of resistors R7 (145) and R5 (150), which are in parallel with RGAIN (155), enable RGAIN (155) to determine the gain adjustment needed to deliver a sufficient voltage signal to the V1 (170) and V2 (175) outputs and maintain the V1+V2 sum. The gain resistor RGAIN (155) operates as a function of the bridge output, thus the differential output (V1−V2) may be adjusted so the ratio R is of a desired value. This is possible because this sum of the two output voltages V1+V2 remains relatively constant, independent of the pressure, and irrespective of the value of the gain resistor RGAIN. Embodiments of the prior art do not utilize such an RGAIN (155) component. Rather, prior art embodiments utilize separate resistors that adjust at the same time, and one skilled in the art will appreciate the difficulty in adjusting two parameters simultaneously.

Further, an additional bias voltage common for both output voltages V1 and V2 may be generated by resistors R3 (160) and R4 (165). In such an embodiment, the value of the bias voltage is equal to −(VIN−)(R7/R3). As VIN− is equal to −VIN+, the bias voltage equals (VIN+)(R7/R3). The values of the resistors may be chosen such that the two output voltages V1 (170) and V2 (175) have a relatively large bias and maintains a relatively constant V1+V2 sum.

To maintain a negligible DC component for the output voltages V1 and V2 (as previously described, the output voltages are AC voltages), the gain circuit uses capacitor C7 (185). Capacitor C7 (185) acts like a short circuit at the operating frequency of about 3 kHz, but has a very large, practically infinite, resistance at DC. As a result, the AC gain is unaffected by capacitor C7 (185) and can be reduced to unity (x1) at DC. Theoretically, this feature is not necessary as the DC output of the bridge is zero, and the operational amplifiers have zero offset. In many environments, however, these voltages are not completely zero, and without capacitor C7 (185), the DC component would be amplified by the same gain as the AC path. Thus, capacitor C7 (185) substantially reduces the DC component such that it becomes a negligible factor, and is substantially equal to the offset voltage of the operational amplifiers.

Additionally, the first and second operational amplifiers U1A (135) and U1B (140) are supplied with two DC voltages, which may be generated by the rectifiers/voltage doublers implemented with the diodes D1A, D1B, D2A, D2B, D3A, D3B, D4A, D4B, and capacitors C1, C2, C3 and C4. Capacitors C5 and C6 may filter out ripple, resulting in stable DC supply voltages for U1A (135) and U1B (140). This implementation allows for the generation of relatively high value output voltages V1 (170) and V2 (175), without the use of transformers.

It will be apparent to those skilled in the art that modifications and variations may be made in the apparatus and process of the present disclosure without departing from the spirit or scope of the disclosure. It is intended that the present disclosure cover the modification and variations of this disclosure provided they come within the scope of the appended claims and their equivalents.

The invention claimed is:

1. A method comprising:
receiving, at first and second input terminals, first and second input voltages, respectively, wherein the first and second input voltages are about 180° relative to each other;
responsive to receiving, at a rectifying circuit assembly in electrical communication with the first and second input terminals, the first and second input voltages, maintaining the direction of the first and second input voltages and doubling the first and second input voltages;
measuring, by a Wheatstone bridge, an applied physical parameter;
outputting, by the Wheatstone bridge and to a capacitor, and to first and second operational amplifiers, first and second signals substantially indicative of the physical parameter;
reducing, by the capacitor, a DC component of the first and second signals;
amplifying, by the first and second operational amplifiers, the first and second signals;
adjusting, by a gain resistor in electrical communication with the first and second operational amplifiers, a differential output between first and second output voltages that correspond to the first and second signals output from the Wheatstone bridge, respectively; and
outputting, by a first output terminal and a second output terminal, the first and second output voltages, respectively.

2. The method of claim 1, wherein the first and second input voltages are AC voltages.

3. The method of claim 1, wherein the first and second input voltages are about +3.5 VRMS and −3.5 VRMS, respectively.

4. The method of claim 1, wherein the first and second input voltages have a frequency of about 3 kHz.

5. The method of claim 4, wherein the first and second output voltages are substantially the same frequency as the first and second input voltages, respectively.

6. The method of claim 1, wherein the first and second output voltages are substantially in-phase with the first and second input voltages, respectively.

7. The method of claim 1, wherein the first and second output voltages change relative to each other depending upon the direction and amount of the applied physical parameter.

8. The method of claim 1, wherein the physical parameter is pressure.

9. The method of claim 1, wherein a sum of the first and second output voltages remains relatively constant.

10. The method of claim 1, wherein the gain resistor operates as a function of the first and second signals output from the Wheatstone bridge.

11. A method comprising:
receiving, at first and second input terminals, first and second input voltages, respectively;
responsive to receiving, at a rectifying circuit assembly in electrical communication with the first and second input terminals, the first and second input voltages, maintaining the direction of the first and second input voltages and doubling the first and second input voltages;
measuring, by a Wheatstone bridge, an applied pressure, the Wheatstone bridge included in a sensing circuit;
outputting, by the Wheatstone bridge and to first and second differential amplifiers, first and second signals substantially indicative of the applied pressure;
receiving, by the first and second differential amplifiers, respectively, the first and second input voltages from the rectifying circuit assembly;
adjusting, by a gain resistor in electrical communication with the first and second differential amplifiers, a differential output between first and second output voltages that correspond to the first and second signals, and wherein the gain resistor operates as a function of the first and second signals outputted from the Wheatstone bridge; and
outputting, by a first output terminal and a second output terminal, the first and second output voltages, respectively, wherein the first and second output voltages change relative to each other depending upon the direction and amount of the applied pressure.

12. The method of claim 11, wherein the first and second input voltages are AC voltages.

13. The method of claim 11, wherein the first and second input voltages are about 180° relative to each other.

14. The method of claim 11 wherein the first and second input voltages are about +3.5 VRMS and −3.5 VRMS, respectively.

15. The method of claim 11, wherein the first and second input voltages have a frequency of about 3 kHz.

16. The method of claim 15, wherein the first and second output voltages are substantially the same frequency as the first and second input voltages, respectively.

17. The method of claim 11, wherein the first and second output voltages are substantially in-phase with the first and second input voltages, respectively.

* * * * *